Jan. 7, 1969  T. E. FESSLER ET AL  3,421,056
THIN WINDOW DRIFTED SILICON, CHARGED PARTICLE DETECTORN
Original Filed Sept. 6, 1963

INVENTORS
THEODORE E. FESSLER
JOHN S. VINCENT
ALBERT B. SMITH
BY
ATTORNEYS

United States Patent Office 3,421,056
Patented Jan. 7, 1969

3,421,056
THIN WINDOW DRIFTED SILICON, CHARGED
PARTICLE DETECTOR
Theodore E. Fessler, Berea, Albert B. Smith, Shaker
Heights, and John S. Vincent, Parma, Ohio, assignors
to the United States of America as represented by the
Administrator of the National Aeronautics and Space
Administration
Original application Sept. 6, 1963, Ser. No. 307,269, now
Patent No. 3,310,443, dated Mar. 21, 1967. Divided and
this application Dec. 20, 1966, Ser. No. 603,396
U.S. Cl. 317—234                                 3 Claims
Int. Cl. H01l 3/12; 5/00

The invention described herein was made by employees of the United States Government and may be manufactured and used by or for the Government purposes without the payment of any royalties thereon or therefor.

The present invention relates, generally, to semiconductor radiation detectors and, more particularly, to an improved ion drifted radiation detector. The invention is particularly directed to such a detector which provides linear response to high energy particles.

This application is a division of copending application Ser. No. 307,269 now Patent No. 3,310,443, which was filed on Sept. 6, 1963.

Solid state radiation detectors offer a simple and effective means for detecting nuclear radiation and have been found very successful when used for measuring the incident energy of charged particles because of their high energy resolution. However, for these devices to provide a linear response to the longer-range particles, the required thickness of the depletion region in the p-n junction has increased. Resort has been had to both higher reverse biasing voltages and to higher resistivity silicon material to increase the thickness of this region but both of these steps suffer from inherent limitations. The maximum voltage that can be applied to the junction is limited, for example, by avalanche breakdown of the material or noise and interference introduced by surface leakage of the induced current. High resistivity material is not easily obtainable. Thus, resort has been had to ion drifted semiconductors to obtain an essentially intrinsic silicon and thereby a thickened depletion region at this junction.

Achievement of an intrinsic region by the use of the ion drift process relies on the drift of mobile donor or acceptor ions in the depletion layer of a reverse-biased n-p junction. The general results of such drift is a tendency to create a thick intrinsic semiconductor layer in the junction region in which donor and acceptor ion impurities exactly compensate and provide the semiconductor with an exceedingly high effective resistivity.

Although many n-type materials are available, lithium has been found most practical for the drifting process since the rate of drift is dependent in large degree upon the smallness and the mobility of the impurity donor ion in the host crystalline structure. Semiconductors drifted with lithium have been successfully utilized to measure extremely high incident energies of radiation particles (up to 24 m.e.v. protons and 96 m.e.v. α particles) but semiconductors produced by prior known processes require extremely close control during fabrication to insure that the intrinsic region closely approaches the semiconductor surface. Additionally, the semiconductors formed have contact surface areas which are thick, pitted and nonuniform, thus decreasing the performance of the detector and detrimentally effecting energy resolution.

It is an object of the present invention to provide a detector comprised of intrinsic silicon, coated with a rectifying contact material that gives uniform response to incident particle energies.

Another object of the present invention is to provide a thick junction drifted radiation detector that does not require close control.

An additional object of the invention is to provide a detector having a thin uniform rectifying contact surface that gives uniform particle resolution.

A more complete appreciation of the invention and many attendant advantages thereof will be readily appreciated as the same becomes better understood by reference to the following detailed description when considered in connection with the accompanying drawing wherein.

According to the present invention, the foregoing and other objects are obtained by providing an improved lithium drifted detector and process for producing the same. In particular, the invention includes the formation of a layer of aluminum on one side of a p-type silicon material, the diffusion of lithium into the opposite side of the p-type material by the application of heat, drifting of the lithium impurity by the combined use of heat and an electrical field applied to the silicon material utilizing the aluminum coating as one of the electrical contacts, removal of the surface layers at the opposite sides of the semiconductor by lapping or the like to provide an essentially intrinsic silicon semiconductor, and the deposition of a thin layer of rectifying contact to these sides of the semiconductor.

Figure 1:
FIGS. 1 through 6 show in schematic cross section the major steps in the fabrication of a lithium drifted semiconductor radiation detector from an original slice of a p-type silicon semiconductor material in accordance with the present invention.

Referring now to the drawing, an appreciation of this invention may be had by describing its use in the fabrication of a thick junction lithium drifted radiation detector. The starting material for this process, shown in FIG. 1, is a slice or wafer 10 of readily obtainable low resistivity p-type silicon. The starting materials actually utilized in practicing the invention were wafers of p-type, 50 ohm-cm. silicon, doped with boron, 3 to 6 mm. thick, and approximately ¾″ in diameter. Preparatory to application of the aluminum coating, the flat sides of the wafer 10 are carefully lapped with a grinding compound to a satin finish to remove mechanical surface imperfections and is carefully washed in a series of baths to remove any chemical impurities from the starting material. A grinding compound such as an 800 mesh $Al_2O_3$ suspended in a light mineral oil has been found satisfactory for the lapping process to thereby obtain the requisite smooth surface. The series of baths which follow lapping may then include the following to insure removal of all impurities:

(1) Water and a detergent.
(2) Acetone.
(3) Dichoroethylene.
(4) Toluene.
(5) Acetone.
(6) Methyl alcohol.
(7) Distilled water.
(8) Equal parts of concentrated $HNO_3$ and $H_2SO_4$.
(9) Distilled water.

After cleaning the slice 10 is then etched in a bath of concentrated acetic, nitric, and 40 percent hydrofluoric acid for a short time of about one to four minutes which is required to remove all pits in its surface and then again washed in distilled water.

Figure 2:
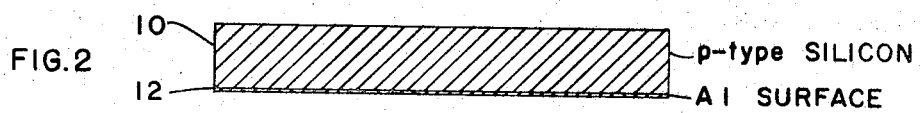

After final cleaning a fairly thick coating 12 of aluminum having a thickness of about 0.1 micron is applied to one flat side of the slice 10. This coating, shown in FIG. 2, serves as one of the electrical contact surfaces for the drifting of the n-type impurity ion and, advantageously, may be applied by a standard vacuum deposition process. After removal of the aluminum coated silicon slice from the vacuum coating apparatus, a suspension of lithium in oil is painted on the opposite side of the slice with a glass rod or the like. Such a suspension comprises 30% lithium, 69% mineral oil, and 1% oleic acid.

Diffusion of the lithium impurity ion into the p-type silicon is then obtained by placing the coated wafer 10 in a small furnace preheated to 450° C., with the lithium side of the wafer up, and allowing it to remain there for approximately four minutes so that the lithium diffuses into the crystaline structure of the silicon wafer. A nitrogen atmosphere is maintain in the furnace to prevent oxidation of the lithium during this diffusion step. After removal from the furnace, the excess lithium on the surface of the detector is removed, for example, by dropping the heated wafer into a beaker of oil which causes the majority of the excess lithium to flake off and remain behind in the oil. One oil found satisfactory for this purpose is "Silicone Oil" (DC 200), sold by Dow-Corning Corporation.

Figure 3:
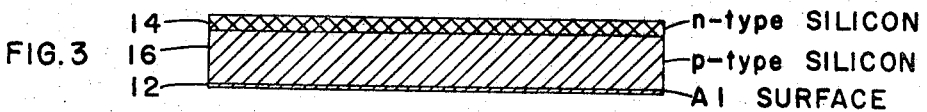
Figure 7:
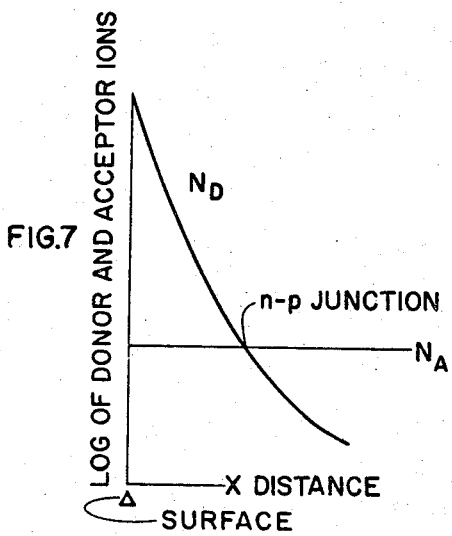
FIG. 7 is a curve graph showing impurity distribution after diffusion.

The lithium diffused wafer then has the structure generally shown schematically in FIG. 3 and comprises an n-type silicon layer 14 and a p-type silicon layer 16. The donor-acceptor profile forming these two layers is illustrated in FIG. 7. The solid horizontal line $N_A$ indicates the level of acceptor impurity (boron) that exists throughout the silicon wafer while the curve $N_D$ indicates the declining level of diffused donor impurity (lithium) X distance from the diffusion surface.

Following the diffusion of lithium into the silicon wafer, the lithium is drifted under the influence of heat and a reverse biasing voltage. This drift occurs because the positively charged lithium ions, when made mobile by the application of heat, move from the Li-excess side of the junction to the Li-deficient side owing to electric field at the junction region.

Figure 4:
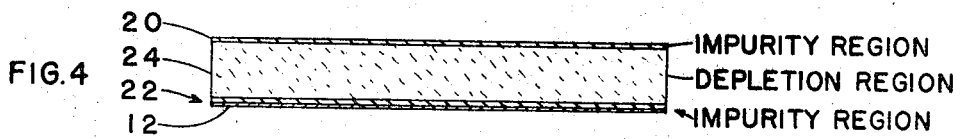
Figure 5:
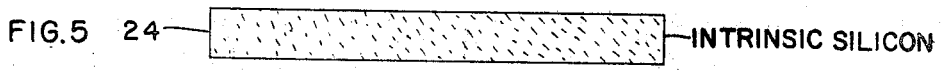

The drifting of lithium may be adequately performed by utilizing a temperature between 100–150° C. and a reverse biasing voltage varying between 200–600 volts impressed across the wafer. It is, of course, essential that the drift rate greatly exceed any diffusion effects due to heating in order to form a thick-junction region. A general description of the drifting process may be found in an article by J. H. Elliot in Nuclear Instruments and Methods 12 (1961) 60, this article clearly indicating the proper procedure and parameters that may be utilized in order to obtain a lithium drifted semiconductor. In the practice of the instant invention a current of 15 milliamperes at 250 volts was initially supplied to the heated silicon water (approximately 150° C.) by a current regulated power supply. As the drifting process progressed, the current and the voltage were maintained essentially at these constant values by reducing the amount of supplementary heat supplied, sufficient ion mobility being obtained by the combination of supplementary heat and heat generated by the electric power imposed on the wafer. After several hours the drifting process is complete, and the semiconductor has the structure shown schematically in FIG. 4. The number of hours required at 15 ma. and 250 volts has been found to proportional to the cube of the thickness of the slices. As shown in FIG. 4 the structure of the semiconductor has an intrinsic or depletion region 24 and impurity regions 20 and 22 consisting of a heavily doped area and the aluminum coated area. The surface area of the lithium side is pitted and uneven due to the diffusion process and the aluminum coated area including a silicon-aluminum allow impurity.

Figure 8:
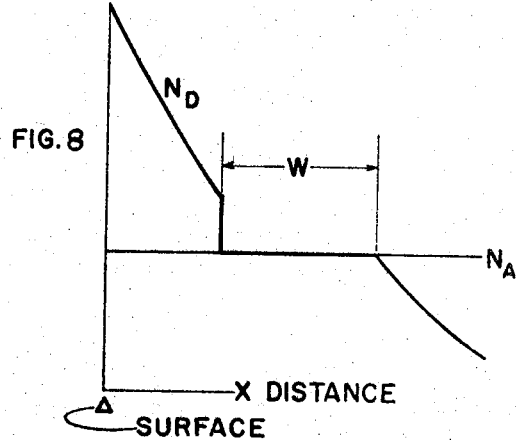
FIG. 8 is a graph showing impurity distribution after drifting.

FIG. 8 also illustrates the effects of the drifting process and shows the distribution of the donor and acceptor impurities and the formation of the intrinsic region W after a portion of the drifting process is completed.

Upon completion of drifting, the flat surfaces of the wafer are lapped to remove the impurity regions. Approximately a 5 mil thickness is removed from each side of the wafer which removes those portions on either side of the intrinsic region W in FIG. 8. This provides a wafer which is stoichiometrically balanced since any uncompensated silicon or excess lithium has been removed. It should be understood that grinding, etching or the like may also be used to remove these surfaces.

Figure 6:
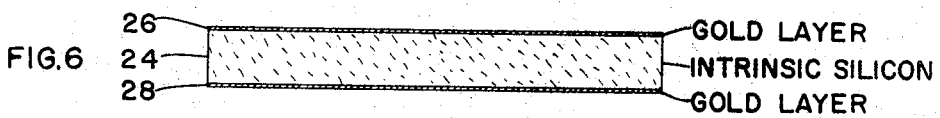

The lapped semiconductor is illustrated schematically in FIG. 6 and consists, essentially, of an intrinsic silicon layer 24 providing a uniformly thick depletion region giving effective resolution of high energy particles. Additionally, since the outer layers of the silicon wafer are removed, no close control of the final stages of the drifting process is required to insure that the depletion region extend to the surface of the silicon semiconductor.

After lapping the wafer is cleaned to remove all DC 200 oil and rinsed in distilled water. The wafers may then be rinsed in the series of baths utilized above for the initial cleaning to insure that the requisite final etch given to the wafer removes any remaining pits or surface irregularities due to lapping. The white etch described previously for the initial preparation of the silicon slice may be utilized to obtain this final etch.

The rectifying contact material for the radiation detector is next applied, to provide a surface through which radiation particles enter the deterctor and surfaces for electrical contact. Vacuum coating of this material has been found best for the purposes of this process since a thin and uniform layer may be obtained. A material which has been used in practicing this method is gold and it may be applied in very thin layers to both the lapped surfaces of the wafer, of course, thicker layers of gold may be applied to suit a particular experimental purpose. In practice it has been found that a thin gold layer having a 20 percent transmission characteristic to light is satisfactory for most research uses. The radiation detector then appears as schematically shown in FIG. 6 wherein the rectifying contact layers are indicated by the numerals 26 and 28.

The requisite electrical connections for the deterctor may then be applied by utilizing a silver paint connection. This connection is best formed by placing a small spot of epoxy cement over the gold contact layer, applying a small circle of gold over the epoxy spot, and then applying the silver paint to the small circle. This arrangement prevents the silver paint from affecting the gold-silicon interface. The completed wafers can then be mounted in any suitable holder and are ready to be utilized.

Obviously, many modifications and variations of the present invention are possible in the light of the above teachings. It is, therefore, to be understood that, within the scope of the appended claims, the invention may be practiced other than as specifically described.

What is claimed is:
1. A thick junction radiation detector comprising:
   a silicon body having an n-type material and a p-type material exactly compensated throughout to provide an intrinsic silicon; and a thin layer of rectifying contact material coating said intrinsic silicon body to provide a radiation detector having uniform energy resolution.
2. A radiation detector as claimed in claim 1 having surfaces coated with a thin layer of gold in contact with the intrinsic silicon.
3. A radiation detector as claimed in claim 2 including electrical contacts in contact with the gold coatings.

References Cited
UNITED STATES PATENTS

| | | | |
|---|---|---|---|
| 2,816,283 | 12/1957 | Steele | 250—211 |
| 3,255,351 | 6/1966 | Walsh et al. | 317—235 |

JOHN W. HUCKERT, *Primary Examiner.*

J. D. CRAIG, *Assistant Examiner.*

U.S. Cl. X.R.

250—211